Jan. 2, 1940.  R. S. RICHARDSON  2,185,607
AMMONIA OXIDATION METHOD
Filed April 23, 1938
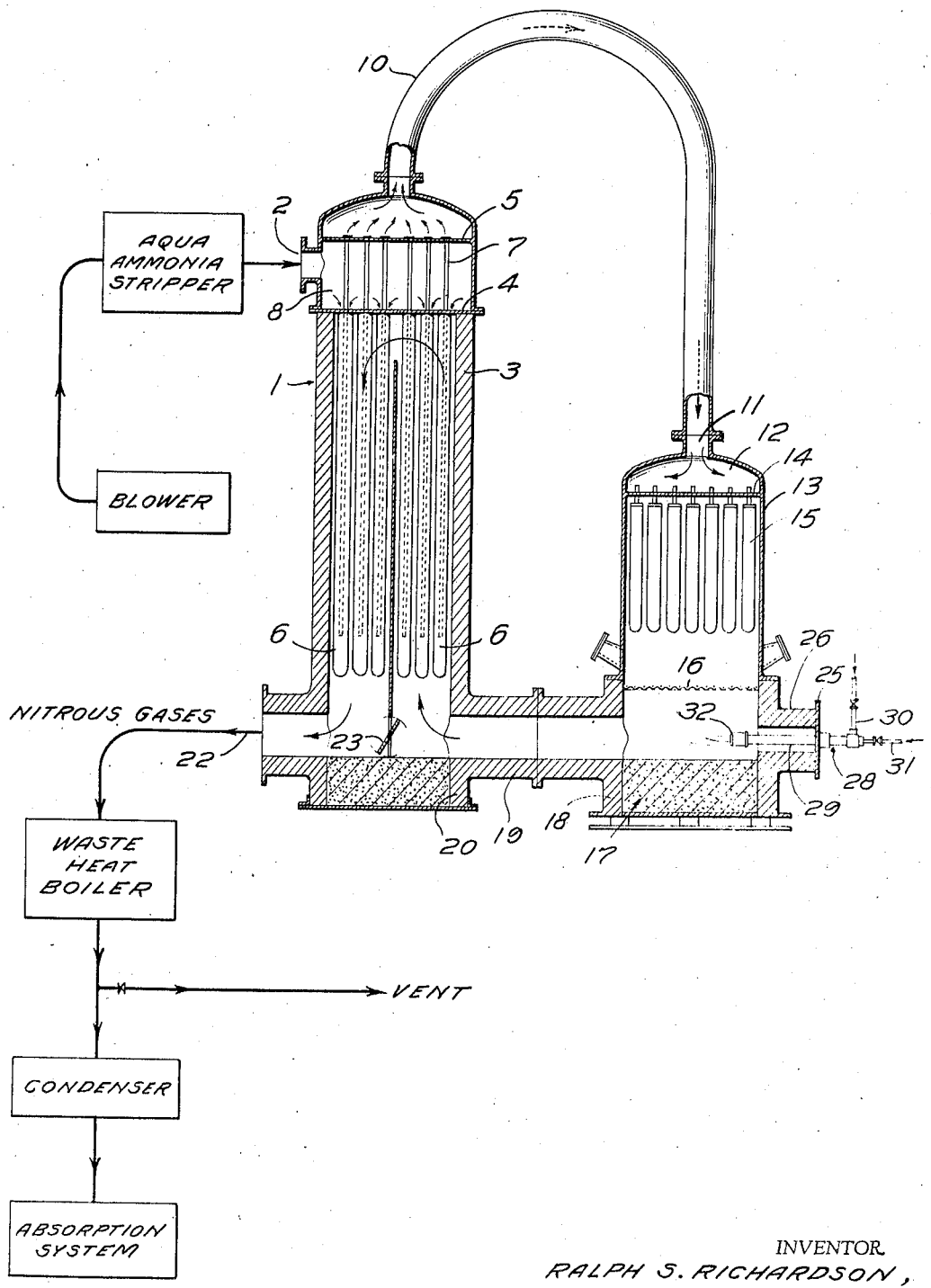
INVENTOR
RALPH S. RICHARDSON,
BY Wm. P. Spielman
ATTORNEY.

Patented Jan. 2, 1940

2,185,607

UNITED STATES PATENT OFFICE 2,185,607

AMMONIA OXIDATION METHOD

Ralph S. Richardson, Scarsdale, N. Y., assignor to Chemical Construction Corporation, New York, N. Y., a corporation of Delaware Application April 23, 1938, Serial No. 203,911

2 Claims. (Cl. 23—162)

This invention relates to an ammonia oxidation system and more particularly to a system for the oxidation of ammonia-air mixture to oxides of nitrogen to be used in the manufacture of nitric acid. Specifically the invention includes, in such a system, a new and improved method and apparatus for starting an ammonia burner.

As is well known, modern nitric acid plants operate upon ammonia as a raw material, and consist of one or more converters or ammonia burners for producing oxides of nitrogen from this material, coolers for lowering the temperature of the gaseous mixtures so produced and for condensing water therefrom, oxidizers for oxidizing the lower oxides of nitrogen to a state in which they are capable of absorption in an aqueous absorbing medium, and an absorption system for accomplishing this result. Most plants also include as standard equipment a preheater in the form of a heat exchanger in which incoming air or an ammonia-air mixture to be oxidized is preheated by heat exchange with gases leaving the burner. A waste heat boiler for recovering additional heat from the gases leaving the burner, and for reducing their temperature, is also usually provided, in order that the temperature of the gas mixture may be lowered to a point where oxidation of the nitric oxide to higher oxides of nitrogen will take place.

In starting up such plants, serious difficulties have been encountered from corrosion of the above described equipment, that is to say, of the ammonia burner, heat exchanger, and waste heat boiler. These pieces of equipment are normally constructed of material subject to corrosion, for they are designed to operate at temperatures far above the dew point of the nitrogen oxide-water mixtures which pass through them when the plant is in normal operation. During the initial period when the plant is starting up, however, they are cold and condensation of the products of the ammonia oxidation takes place therein.

The customary method of starting up the burners of an ammonia oxidation plant is to create a hot spot on the catalyst gauze by the application of a hydrogen torch, meanwhile turning on the ammonia-air mixture. When this mixture has caught, the torch is removed and the combustion gradually spreads until the entire gauze is lighted, after which the temperature gradually builds up to the range of 800° C. or higher which is most favorable for the production of oxides of nitrogen. It is apparent, however, that during this preliminary period when only a part of the gauze is lighted, as well as during the subsequent period before the converter reaches its proper temperature, considerable quantities of unreacted ammonia pass through the catalyst and into the following apparatus. Moreover, at temperatures lower than the optimum range much of the products of combustion of the ammonia are nitrogen and water vapor, which are inert and cause loss of yield during the initial period of operation. For all of the above reasons the starting up of a nitric acid plant is considered as a costly and troublesome procedure, and is frequently avoided wherever possible by keeping the plant in continuous operation even though there is no immediate need for the nitric acid obtained therefrom.

In addition to the use of a removable hydrogen torch, it has also been proposed to preheat the catalyst gauze by passing through it a burning mixture of hydrogen or illuminating gas and air from a stationary burner located in the base of the converter. This of course is nothing more than a substitute for the removable hydrogen torch, designed to apply hot products of combustion directly to the catalyst gauze to preheat it to ignition temperatures. Either expensive hydrogen must be used for this purpose, or if illuminating gas is used it must be carefully purified from catalyst poisons that would soon reduce or destroy the catalytic efficiency of the platinum gauze.

The present invention avoids the above and other difficulties by providing means whereby the entire oxidation and cooling system of the plant may be preheated to temperatures above the dew point of the nitric oxide gases before the ammonia-air mixture is admitted to the system. In accordance therewith a gas burner is used to provide the necessary heat, but this gas heater is so located that the products of combustion do not pass through the catalyst gauze. On the contrary, the gas burner is so located as to discharge its products of combustion into the gases after they have left the catalyst and preferably before they enter the air preheater. The process of the present invention is therefore one in which an incoming stream of air is preheated by indirect heat exchange with hot products of combustion leaving the base of the ammonia-burner and this preheated air is then used to preheat the ammonia converter and its catalyst gauze to ignition temperatures.

The invention will be described in greater detail in conjunction wtih the accompanying drawing, which is a diagrammatic illustration of a preferred modification thereof. In this drawing, a flow diagram of a nitric acid plant is illustrated, the details of the ammonia converter and gas preheater of the invention being shown in their proper relationship to the remainder of the plant.

Referring to the drawing, the nitric acid plant consists generally of a system for preparing an ammonia-air mixture under atmospheric or superatmospheric pressures, this system including a stripper in the form of a packed tower in which a recirculating flow of aqua-ammonia is passed in countercurrent to a rising stream of air from the burner. The ammonia-air mixture so produced is introduced into the inlet 2 of a preheater 1, this being essentially a heat exchanger in which, during normal operation of the plant, the incoming ammonia-air mixture is passed in heat exchanging relation with the hot nitrous gases leaving the catalyst. The heat exchanger illustrated consists of an outer shell 3 in the upper part of which are mounted lower and upper tube sheets 4 and 5 into which are affixed respectively outer closed end tubes 6 and inner open end tubes 7. The inlet 2 leads into a gas heater space 8 between the upper and lower tube sheets from which the gas passes downwardly through the annular space between the outer walls of the open end tubes 7 and the inner walls of the closed end tubes 6. The gas then passes upwardly within the open end tubes 7 and is finally discharged into the gas outlet pipe 10 through which it is conducted to a gas inlet 11 in the ammonia burner or converter 12.

While it is an advantage of the invention that an ammonia burner of any type may be used, the one illustrated comprises an outer shell 13 of aluminum or other material which is not catalytically active to a hot ammonia-air mixture, this shell containing an upper partition 14 in the form of a tube sheet from which are suspended a number of ceramic filter tubes 15. These tubes serve to filter out dust and impurities from the hot gases before they strike the catalyst gauze 16, which is retained between the shell 13 of the converter and a lower shell or base 17 which is preferably of masonry or ceramic material.

The base 17 consists generally of a cylindrical portion 18 constituting an outlet header for the hot nitrous gases leaving the catalyst and an outlet pipe 19 leading into the base 20 of the heat exchanger 1. In accordance with the present invention this base 17 also contains a gas burner 28 which provides hot products of combustion when starting up the plant.

While the invention in its broader aspects is not limited to any specific type of burner, the burner illustrated is one of the injection type in which a mixing tube 29 provided with a gas inlet 30 and an air inlet 31 is used to prepare a combustible mixture which is burned at the nozzle 32. This burner is supported in the base 17 by means of a plate 25 attached to a cylindrical projection 26 thereon, and is preferably opposite the gas outlet pipe 19 in order to discharge the products of combustion directly into this pipe.

In operating the invention for starting up a nitric acid plant which is cold, air from the blower is passed through the stripper and into the inlet 2 of the heat exchanger, but no aqua ammonia is fed to the stripper. Accordingly, only air passes through the tubes of the heat exchanger. It is then passed through the pipe 10 into the burner and through the catalyst gauze 16 into the lower shell 17. From this point it passes through the outlet pipe 19 into the base 20 of the heat exchanger 1 and is directed upwardly therein by a central baffle 23 which causes it to pass over the outer tubes 6 and downwardly and out through the exit pipe 22. After the circulation of air has been established, the burner 28 is lighted and the hot mixture of air and products of combustion passes through the heat exchanger. The heat exchanger causes them to transfer the greater part of their heat to the incoming air mixture, and a heat transfer cycle is thereby established which quickly preheats the converter and heat exchanger to ignition temperatures of 300–400° C. When these temperatures have been reached the aqua ammonia may be introduced into the stripper and an ammonia-air mixture takes the place of the pure air in the cycle.

The air and products of combustion leaving the outlet 22 of the heat exchanger are preferably passed through the waste heat boiler, which is usually included in present day nitric acid plants, in order to warm its tubes and recover additional heat. The mixture is then preferably vented from the system as indicated on the drawing.

While it is possible to ignite the ammonia-air mixture at the low temperatures of 300–400° C. as above indicated, it is well known that at these low temperatures the first products of combustion will consist mostly of nitrogen and water vapor with only slight traces of nitric acid. Accordingly, it may be preferable to continue the operation of the heater until the catalyst has been preheated to 600–700° C. before shutting it off. At these temperatures nitric oxide is the main oxidation product. It is an advantage of the present invention that these high temperatures can easily be obtained at the catalyst without contaminating it by undue exposure to impure products of combustion, for the stream of air passing downwardly through the catalyst will prevent any of the products of combustion from coming into contact with it.

While the invention has been described specifically in conjunction with a single illustration, it is understood that this description is for illustrative purposes only and that the invention in its broader scope is limited only by the claims appended hereto.

What I claim is:

1. In the production of oxides of nitrogen by the catalytic oxidation of ammonia, a method of starting the process which comprises passing a stream of air through a catalyst gauze, then injecting hot combustion gases other than the gases resulting from the combustion of ammonia into said stream of air, then passing the resulting hot gas mixture in heat exchanging relation with an earlier portion of said air stream to preheat the latter and finally, when the catalyst gauze is heated to ignition temperatures, vaporizing ammonia into said air stream in advance of said heat exchanging step.

2. In an ammonia oxidation system, in combination, an ammonia burner including a catalyst gauze, a heat exchanger, means for passing gas from said heat exchanger to the gas inlet of said ammonia burner, means for passing gas from the ammonia burner through the heat exchanger in indirect heat exchange relationship with the gas leaving said heat exchanger, and means for introducing hot combustion gases other than the gases resulting from the combustion of ammonia into the gas leaving said ammonia burner for said heat exchanger, said means being so directed that the hot combustion gases do not contact the catalyst gauze.

RALPH S. RICHARDSON.